United States Patent
Sugiyama et al.

(10) Patent No.: US 10,563,700 B2
(45) Date of Patent: Feb. 18, 2020

(54) TRIPOD TYPE CONSTANT VELOCITY UNIVERSAL JOINT

(71) Applicant: NTN CORPORATION, Osaka (JP)

(72) Inventors: Tatsuro Sugiyama, Shizuoka (JP); Hiroaki Makino, Shizuoka (JP)

(73) Assignee: NTN Corporation, Osaka (JP)

( * ) Notice: Subject to any disclaimer, the term of this patent is extended or adjusted under 35 U.S.C. 154(b) by 259 days.

(21) Appl. No.: 15/556,156

(22) PCT Filed: Feb. 25, 2016

(86) PCT No.: PCT/JP2016/055565
§ 371 (c)(1),
(2) Date: Sep. 6, 2017

(87) PCT Pub. No.: WO2016/147827
PCT Pub. Date: Sep. 22, 2016

(65) Prior Publication Data
US 2018/0045249 A1    Feb. 15, 2018

(30) Foreign Application Priority Data

Mar. 13, 2015    (JP) .................................. 2015-051120

(51) Int. Cl.
*F16D 3/205*    (2006.01)
(52) U.S. Cl.
CPC ........... *F16D 3/2055* (2013.01); *F16D 3/205* (2013.01); *Y10S 464/905* (2013.01)
(58) Field of Classification Search
CPC ..... F16D 3/2055; F16D 3/205; Y10S 464/905
USPC .................................................. 464/111, 132
See application file for complete search history.

(56) References Cited

U.S. PATENT DOCUMENTS 9,115,764 B2 *   8/2015   Mizuno ................. F16D 3/2055
2007/0167243 A1   7/2007   Kawakatsu et al.

FOREIGN PATENT DOCUMENTS

| CN | 1926350 | 3/2007 |
|----|---------|--------|
| EP | 1 726 839 | 11/2006 |
| JP | 2005-036982 | 2/2005 |
| JP | 3947342 | 7/2007 |
| JP | 2008-25599 | 2/2008 |
| JP | 2009-58076 | 3/2009 |

(Continued)

OTHER PUBLICATIONS

Extended European Search Report dated Oct. 29, 2018 in counterpart European Patent Application No. 16764657.9.

(Continued)

*Primary Examiner* — Greg Binda
(74) *Attorney, Agent, or Firm* — Wenderoth, Lind & Ponack, L.L.P.

(57) ABSTRACT

A tripod type constant velocity universal joint includes an outer joint member having track grooves, a tripod member including trunnion journals, and spherical rollers each fitted in a rotatable manner about each of the trunnion journals through intermediation of a plurality of needle rollers. A corner portion is formed at a root portion of each of the trunnion journals so as to restrict movement of the plurality of needle rollers in the axial direction toward the root portion of each of the trunnion journals by interference between an end surface corner rounded portion of each of the plurality of needle rollers and the corner portion at the root portion.

7 Claims, 13 Drawing Sheets

(56) References Cited

FOREIGN PATENT DOCUMENTS

JP          2009-68509      4/2009
JP          2013-234702     11/2013

OTHER PUBLICATIONS

Office Action dated May 27, 2019 in corresponding Chinese Patent Application No. 2016800141505, with English Translation of Search Report.
International Preliminary Report on Patentability and Written Opinion of the International Searching Authority dated Sep. 19, 2017 in corresponding International (PCT) Application No. PCT/JP2016/055565.
International Search Report dated May 31, 2016 in International (PCT) Application No. PCT/JP2016/055565.
The Society of Automotive Engineers "Universal Joint and Driveshaft Design Manual—Advances in Engineering Series No. 7 (AE-7)" Section 3.2.6.—Tripot Universal Joint (End Motion Type), pp. 131-140, Figure 10 on p. 138, 1991.

\* cited by examiner

US 10,563,700 B2

TRIPOD TYPE CONSTANT VELOCITY UNIVERSAL JOINT

TECHNICAL FIELD

The present invention relates to a plunging tripod type constant velocity universal joint to be used for power transmission in automobiles, industrial machines, and the like.

BACKGROUND ART

As illustrated in FIG. 12a, a tripod type constant velocity universal joint 51 includes an outer joint member 52, a tripod member 60, and spherical rollers 70. The outer joint member 52 has three track grooves 53 formed at trisected positions in a circumferential direction to extend in an axial direction. Roller guide surfaces 54 are formed on opposed side walls of each track groove 53. The tripod member 60 includes trunnion journals 62 radially projecting from trisected positions on a trunnion barrel 61 in the circumferential direction. The spherical rollers 70 are each fitted in a freely rotatable manner about each trunnion journal 62 through intermediation of a plurality of needle rollers 72. The spherical rollers 70 are received in the track grooves 53 of the outer joint member 52, and an outer spherical surface of each spherical roller 70 is guided by the roller guide surfaces 54 formed on both the side walls of each track groove 53.

A root portion A' of the above-mentioned trunnion journal 62 is illustrated in FIG. 12b in an enlarged manner. As illustrated in FIG. 12b, the root portion A' is formed into a rounded surface having a curvature radius Rb, which is continuous with a cylindrical outer peripheral surface 74 serving as an inner raceway surface for the needle roller 72. The root portion A' is connected to a shoulder surface 61a. An inner washer 78 is interposed between an end portion of the needle roller 72 and the shoulder surface 61a. Movement of the needle roller 72 in the axial direction toward the root portion A' of the trunnion journal 62 is restricted by contact between a side surface of the inner washer 78 and an end surface of the needle roller 72 (see Patent Document 1).

As illustrated in FIG. 12c, there is also known a tripod type constant velocity universal joint without an inner washer at a root portion A" of a trunnion journal 62'. In this case, movement of a needle roller 72' in an axial direction toward the root portion A" of the trunnion journal 62' is restricted by contact between a shoulder surface 61a' formed on a trunnion barrel 61' and an end surface of the needle roller 72' (see, for example, Patent Document 2).

PRIOR ART DOCUMENTS

Patent Documents

Patent Document 1: JP 3947342 B2
Patent Document 2: JP 2005-36982 A

SUMMERY OF THE INVENTION

Problems to be Solved by the Invention

For both of the tripod type constant velocity universal joint described in Patent Document 1 and the tripod type constant velocity universal joint described in Patent Document 2, reduction in joint outer diameter is taken into consideration. For achievement of the reduction, a pitch circle diameter (PCD) of the roller guide surfaces is required to be reduced while ensuring a thickness of the root portion, which is a minimum thickness of the tripod member. The inner washer 78 is provided to the tripod type constant velocity universal joint 51 described in Patent Document 1, and hence it is difficult to set positions of the needle rollers 72 radially inward in a radial direction of the joint. Therefore, the PCD cannot be reduced unless other efforts are made.

Meanwhile, in the tripod type constant velocity universal joint described in Patent Document 2, a recess 74a is required to be provided to the root portion A" of the trunnion journal 62' so as to bring the end surface of the needle roller 72 and the shoulder surface 61a' into contact with each other without providing the inner washer. When the recess 74a is provided, it is conceivable that a thickness of the root portion A" is reduced to decrease strength and that a length of a cylindrical outer peripheral surface 74' serving as an inner raceway surface for the needle roller 72' in the radial direction of the joint is reduced by a length of the recess 74a in the radial direction of the joint to result in a reduced rolling fatigue life.

In recent years, there has been increasing a demand for higher fuel efficiency of automobiles, thereby arousing a strong desire for further downweighting of the constant velocity universal joint as one of the components of automobiles and reduction in joint outer diameter. Attention is focused on that the tripod type constant velocity universal joint that has been proposed thus far cannot meet the above-mentioned demand.

The present invention has been made in view of the above-mentioned problem, and has an object to provide a lightweight and compact tripod type constant velocity universal joint which is unachievable by the related art while maintaining strength and life.

Solutions to the Problems

As a result of various examinations and verifications for attaining the above-mentioned object, the inventors of the present invention have achieved the present invention based on the following findings and ideas.

(1) It is essential to connect a cylindrical outer peripheral surface and a shoulder surface at a root portion of a trunnion journal of the tripod type constant velocity universal joint through a rounded shape in terms of strength. Therefore, when the rounded shape is connected to the shoulder surface through a shape without a recess, an inner washer is provided so as to achieve a structure in which a side surface of the washer and an end surface of a needle roller are held in contact with each other. When the inner washer is not provided, the recess having the rounded shape is provided so as to be connected to the shoulder surface. In this case, the end surface of the needle roller and the shoulder surface are held in direct contact with each other. As described above, it is common general technical knowledge to achieve restriction with the end surface of the needle roller and a flange surface or the side surface of the inner washer, specifically, through contact between the surfaces (see SAE Universal Joint and Driveshaft DESIGN MANUAL Section 3.2.6., FIG. 10 on page 138).

(2) For development of the tripod type constant velocity universal joint having a small joint outer diameter, attention was focused on impossibility of ensuring a length of the needle roller with the inner washer type structure. Thus, a tripod type constant velocity universal joint of type in which the recess was provided so that the end surface of the needle roller and the shoulder surface were held in direct contact with each other was manufactured so as to carry out a durability test. As a result, it was proven that damage due to an edge load was generated at the end portion of the needle roller on a side closer to the root portion and rotation of the needle roller was not stable. Causes thereof were examined. As a result, the following was considered. Specifically, as illustrated in FIG. 11, when a needle roller 5 is moved toward a root portion A" to abut against a shoulder surface 8a, an end portion of the needle roller 5 is positioned at a boundary edge portion 10a' between a cylindrical outer peripheral surface 10 of a trunnion journal 9 and a recess 10a, and hence the edge load is generated. A contact length between the needle roller 5 and the cylindrical outer peripheral surface 10 of the trunnion journal 9 is reduced by a length of the recess 10a. Thus, a load center (center on the contact length) Pn of the needle roller 5 and a load center (center of the spherical roller in a width direction) Pr of a spherical roller do not match with each other anymore in an axial direction of the trunnion journal 9. Thus, a load balance is lost to prevent the rotation of the needle roller 5 from being stable. This tendency becomes conspicuous in the compact tripod type constant velocity universal joint.

(3) Through the consideration in the item described above, there was obtained an idea that the contact of the needle roller with the cylindrical outer peripheral surface of the trunnion journal over an entire length, which is except for an end surface corner rounded portion, and approximate match between the load center of the needle roller and the load center of the spherical roller with each other in an axial direction of the trunnion journal 9 were key components. This idea became a motivator to manufacture a test sample in which the corner portion without the recess shape was formed at the root portion of the trunnion journal as a technically unconventional positioning structure for the needle roller so as to attempt the durability test.

(4) As a result of the durability test described in the above-mentioned item, it was unexpectedly proven that movement of the needle roller toward the root portion was successfully restricted by interference between the end surface corner rounded portion of the needle roller and the corner portion without the recess shape at the root portion of the trunnion journal. The reason for the result described above is considered as follows. When the tripod type constant velocity universal joint is rotated while taking an operating angle, the trunnion journal makes a rocking motion corresponding to a repeated wiper-like motion from a state inclined to one side to a state inclined to an opposite side for one revolution. A rolling amount of the needle roller along with the rocking motion is significantly smaller than a rolling amount of a rolling element in a general rolling bearing, which is considered to be the reason for the result described above.

As a technical measure to attain the above-mentioned object, according to one embodiment of the present invention, there is provided a tripod type constant velocity universal joint, comprising: an outer joint member having track grooves formed at trisected positions on the outer joint member in a circumferential direction of the tripod type constant velocity universal joint to extend in an axial direction of the tripod type constant velocity universal joint; a tripod member comprising trunnion journals radially projecting from trisected positions on a trunnion barrel in the circumferential direction; and spherical rollers each fitted in a rotatable manner about each of the trunnion journals through intermediation of a plurality of needle rollers, the spherical rollers being received in the track grooves, and each having an outer spherical surface guided by roller guide surfaces formed on both side walls of each of the track grooves, in which a corner portion without having a recess shape is formed at a root portion of the each of the trunnion journals so as to restrict movement of each of the plurality of needle rollers in the axial direction toward the root portion of the each of the trunnion journals by interference between an end surface corner rounded portion of the each of the plurality of needle rollers and the corner portion at the root portion. In this manner, a radial position of the needle roller can be set radially inward while maintaining strength and life, and the number of components is reduced, thereby being capable of achieving downweighting and compactification which are unachievable by the related art.

Specifically, it is preferred that the corner portion at the root portion of the each of the trunnion journals comprise a rounded shape. As a result, strength at the root portion is ensured to facilitate continuous hardened steel cutting work from the cylindrical outer peripheral surface of the trunnion journal to the corner portion. Further, grinding with an integrated grinding stone from the cylindrical outer peripheral surface to the corner portion is facilitated.

It is preferred that a ratio R/r of a curvature radius R of the corner portion at the root portion of the each of the trunnion journals and a curvature radius r of the end surface corner rounded portion of the each of the plurality of needle rollers be set in a range of from 1.0 to 5.0. As a result, the strength and durability of the root portion are ensured, while excellent processability is obtained to provide high practicality.

Through the continuous hardened steel cutting work or the grinding with the integrated grinding stone from the cylindrical outer peripheral surface being a raceway surface of the above-mentioned trunnion journal to the corner portion at the root portion, the corner portion smoothly connected to the cylindrical outer peripheral surface can be formed. In addition, processing is facilitated.

It is preferred that a surface hardness of a cylindrical outer peripheral surface serving as a raceway surface of the each of the trunnion journals and the corner portion at the root portion be set smaller than a surface hardness of the each of the plurality of needle rollers. As a result, the strength of the corner portion at the root portion can be ensured, while reliable positioning performance for the needle roller is obtained.

It is preferred that a central position of the each of the plurality of needle rollers over a length thereof be caused to approximately match with a pitch circle diameter (PCD) of the roller guide surfaces. As a result, a good balance between the spherical roller and the needle roller is obtained to stabilize the rotation of the needle roller.

Effects of the Invention

According to the tripod type constant velocity universal joint of the present invention, radial positions of the needle rollers can be set radially inward while maintaining strength and life. Thus, the number of components is reduced. As a result, downweighting and compactification which are unachievable by the related art can be achieved.

BRIEF DESCRIPTION OF DRAWINGS

FIG. 9 is an enlarged view of a root portion A of FIG. 8a.

FIG. 12b is an enlarged view of a root portion A' of FIG. 12a.

EMBODIMENTS OF THE INVENTION

One embodiment of the present invention is described with reference to FIG. 1a to FIG. 10.

Figure 1A:
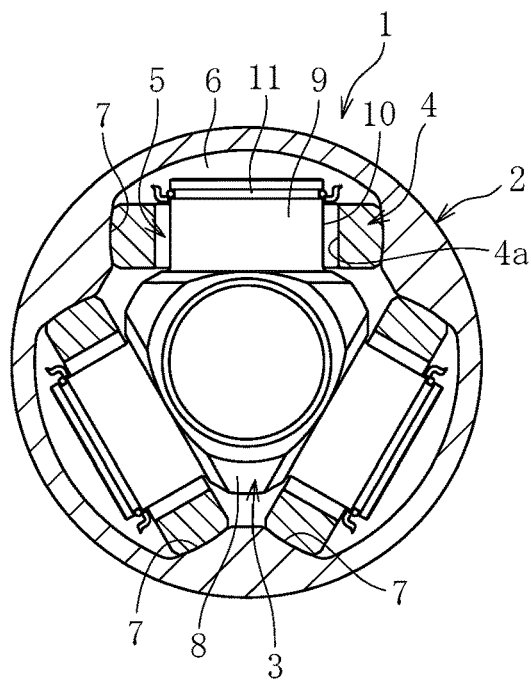
FIG. 1a is a traverse sectional view of a tripod type constant velocity universal joint according to one embodiment of the present invention.
Figure 1B:
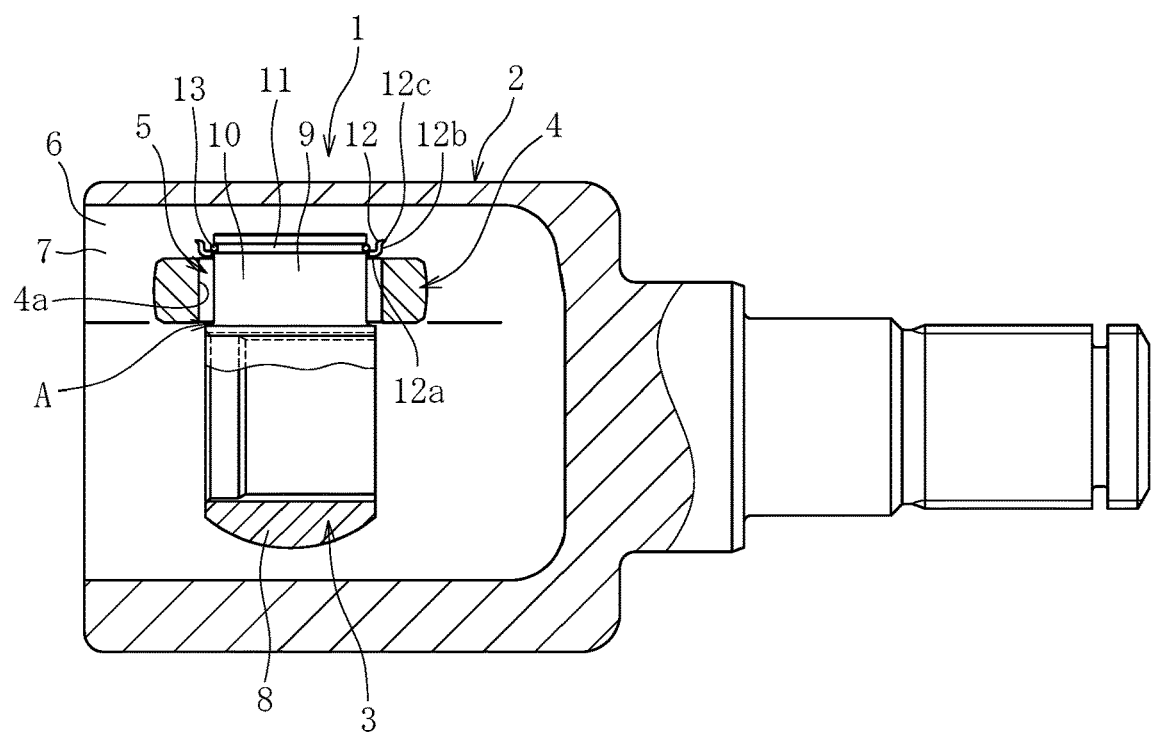
FIG. 1b is a longitudinal sectional view of the tripod type constant velocity universal joint according to the one embodiment of the present invention.

FIG. 1a is a transverse sectional view of a tripod type constant velocity universal joint according to one embodiment of the present invention. FIG. 1b is a longitudinal sectional view for illustrating the tripod type constant velocity universal joint according to the one embodiment of the present invention. As illustrated in FIG. 1a and FIG. 1b, a tripod type constant velocity universal joint 1 according to this embodiment mainly comprises an outer joint member 2, a tripod member 3 serving as an inner joint member, spherical rollers 4, and needle rollers 5 serving as rolling elements. The outer joint member 2 has a hollow cup shape with three track grooves 6 formed on an inner periphery thereof at trisected positions in a circumferential direction to extend in an axial direction. Roller guide surfaces 7 are formed on opposed side walls of each track groove 6. The roller guide surfaces 7 are formed as parts of a cylindrical surface, that is, as partial cylindrical surfaces.

The tripod member 3 comprises a trunnion barrel 8 and trunnion journals 9. Three trunnion journals 9 are formed to radially project from trisected positions on the trunnion barrel 8 in the circumferential direction. Each trunnion journal 9 has a cylindrical outer peripheral surface 10 and an annular retaining ring groove 11 formed in the vicinity of a shaft end of the trunnion journal 9. The spherical roller 4 is fitted in a freely rotatable manner about the cylindrical outer peripheral surface 10 of the trunnion journal 9 through intermediation of the plurality of needle rollers 5. The cylindrical outer peripheral surface 10 of the trunnion journal 9 serves as an inner raceway surface for the needle rollers 5. An inner peripheral surface 4a of the spherical roller 4 has a cylindrical shape and serves as an outer raceway surface for the needle rollers 5.

In the retaining ring groove 11 formed in the vicinity of the shaft end of the trunnion journal 9, a retaining ring 13 is fitted through intermediation of an outer washer 12. Movement of the needle rollers 5 in an axial direction of the trunnion journal 9 is restricted by a root portion A of the trunnion journal 9 and the outer washer 12. The outer washer 12 comprises a disc portion 12a extending in a radial direction of the trunnion journal 9, and a cylindrical portion 12b extending in the axial direction of the trunnion journal 9. The cylindrical portion 12b of the outer washer 12 has an outer diameter that is smaller than a diameter of the inner peripheral surface 4a of the spherical roller 4, and an end portion 12c of the cylindrical portion 12b, which is located on an outer side when viewed in a radial direction of the tripod member 3, is formed to have a diameter that is larger than that of the inner peripheral surface 4a of the spherical roller 4. Thus, the spherical roller 4 is movable in the axial direction of the trunnion journal 9, and is prevented from dropping off by the end portion 12c.

Figure 2:
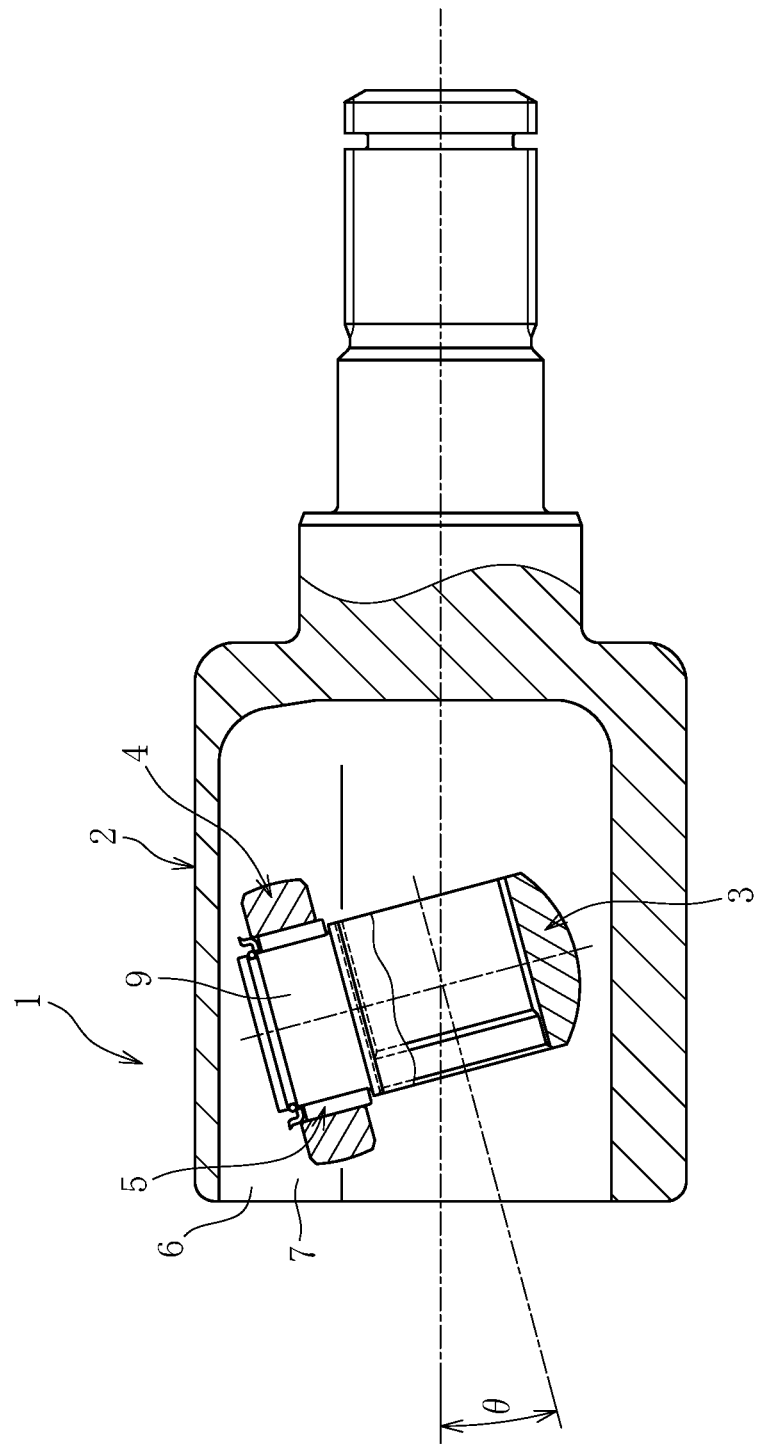
FIG. 2 is a longitudinal sectional view for illustrating a state in which the tripod type constant velocity universal joint illustrated in FIGS. 1 takes an operating angle.

The spherical roller 4 fitted on the trunnion journal 9 of the tripod member 3 in a freely rotatable manner is guided by the roller guide surfaces 7 of the track groove 6 of the outer joint member 2 in a freely rotatable manner. In FIG. 2, there is illustrated a state in which the tripod type constant velocity universal joint 1 takes an operating angle θ. The roller guide surfaces 7 are formed as partial cylindrical surfaces. Thus, the spherical rollers 4 can be inclined inside the roller guide surfaces 7. With this structure, relative axial displacement and relative angular displacement between the outer joint member 2 and the tripod member 3 are absorbed so that the rotation is transmitted at constant velocity.

The spherical roller 4 and each roller guide surface 7 are generally brought into contact with each other in two ways, that is, angular contact and circular contact. In the angular contact, the spherical roller 4 and the roller guide surface 7 are brought into contact with each other at two points with a contact angle. In the circular contact, the spherical roller 4 and the roller guide surface 7 are brought into contact with each other at one point as illustrated in FIG. 4. In this embodiment, assuming that Rt represents a curvature radius of the roller guide surface 7 and Rr represents a curvature radius of the spherical roller 4, a contact ratio Rt/Rr is set within a range of from about 1.02 to about 1.15. In this embodiment, a width Ls of the spherical roller 4 (see FIG. 3) is significantly reduced as compared to that of a related-art tripod type constant velocity universal joint as described later, and hence the circular contact is desired.

Figure 3:
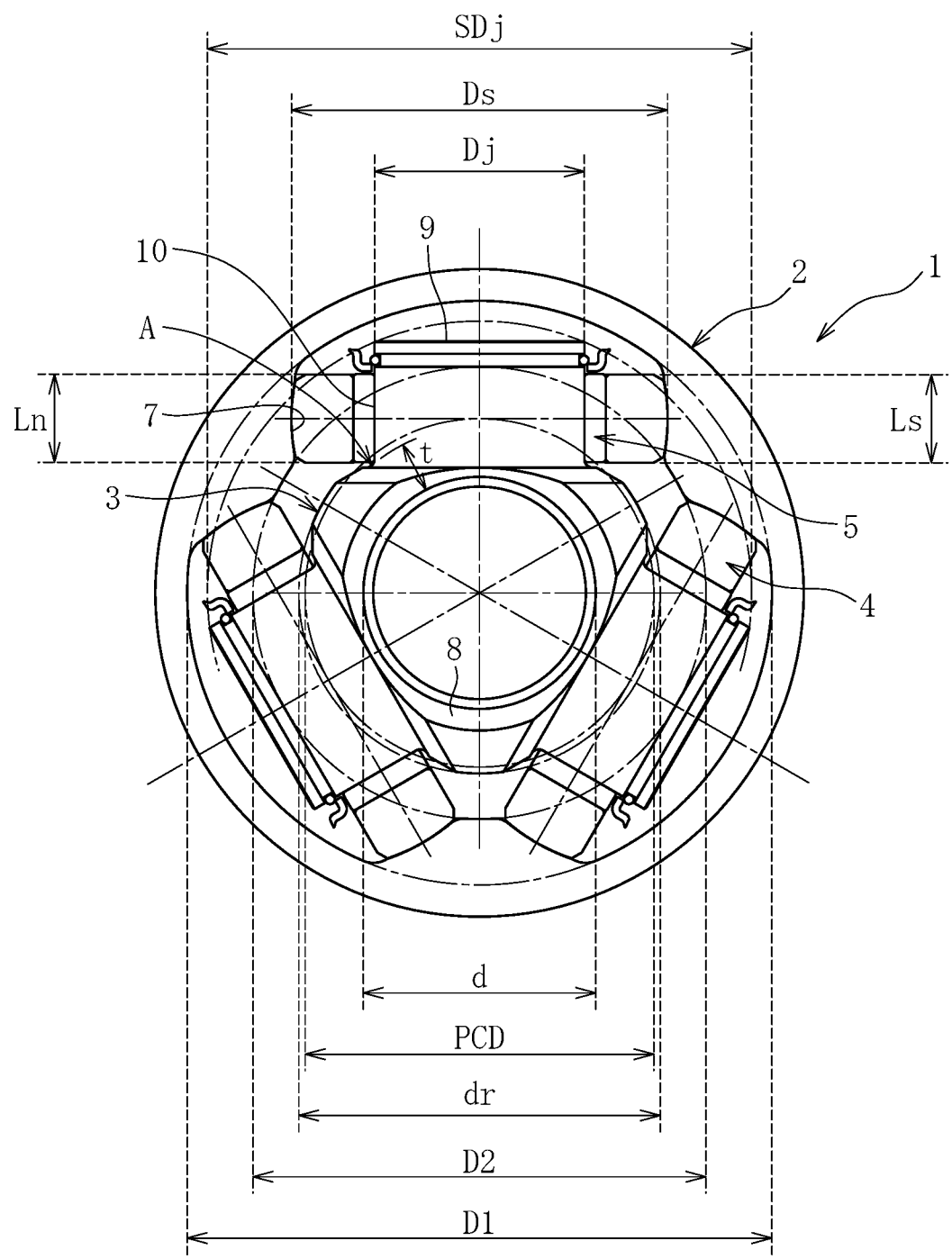
FIG. 3 is a traverse sectional view for illustrating dimensions of components of the tripod type constant velocity universal joint illustrated in FIGS. 1.
Figure 4:
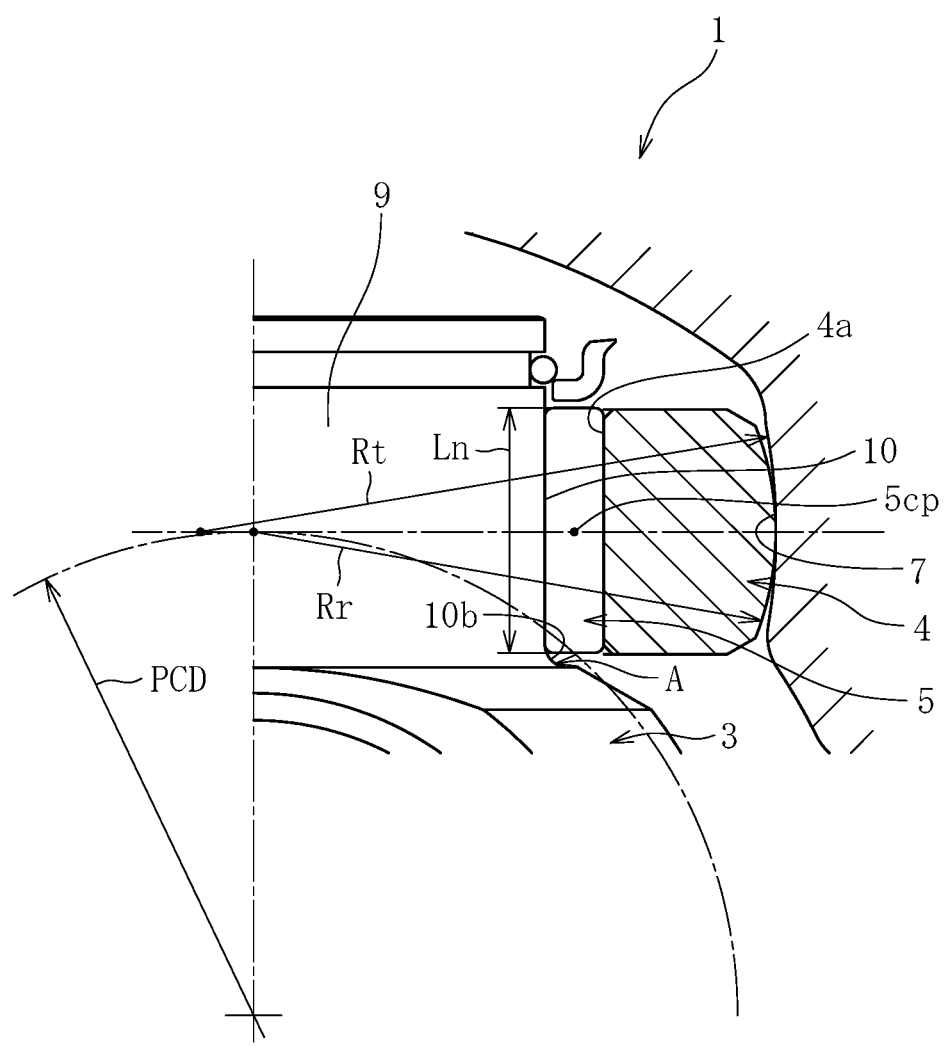
FIG. 4 is a traverse sectional view of a contact portion between a spherical roller and a roller guide surface illustrated in FIGS. 1 in an enlarged manner.

As illustrated in FIG. 3, a radially inner part of the outer joint member 2 comprises large inner-diameter portions each having an inner diameter D1 and small inner-diameter portions each having an inner diameter D2, which are formed alternately in the circumferential direction. The tripod member 3 mounted into the outer joint member 2 has a spline hole formed in the trunnion barrel 8 thereof to have a spline large diameter (shaft diameter) d. The cylindrical outer peripheral surface 10 of the trunnion journal 9 has an outer diameter Dj. The tripod member 3 has an outer diameter SDj, and the trunnion barrel has an outer diameter dr. The spherical roller 4 has an outer diameter Ds and the width Ls. The needle roller 5 has a length Ln. The roller guide surfaces 7 have a pitch circle diameter PCD.

To achieve reduction in joint outer diameter while maintaining the strength and life, the tripod type constant velocity universal joint 1 according to this embodiment has dimensional settings significantly different from those of the related art. Basic dimensional settings of the tripod type constant velocity universal joint 1 according to this embodiment are first described.

The strength of the tripod type constant velocity universal joint 1 is basically set to the shaft strength or more, but the strength of the tripod member 3 and the strength of the spherical roller 4 need to be ensured in the second place. In view of this, the tripod type constant velocity universal joint 1 according to this embodiment has dimensional settings on the premise that the strength of the tripod member 3 and the strength of the spherical roller 4 may be ensured.

As a basic measure, assuming that the shaft diameter d determined for each joint size has a constant value, the pitch circle diameter PCD of the roller guide surfaces 7 is reduced significantly in accordance with a dimensional setting while ensuring a minimum thickness t of the trunnion barrel 8 at the root portion A of the trunnion journal 9 in a torque applying direction.

To achieve the above-mentioned basic measure, it is necessary to ensure the minimum thickness t of the trunnion barrel 8 at the root portion A of the trunnion journal 9 in the torque applying direction even though the pitch circle diameter PCD of the roller guide surfaces 7 is reduced as described above. Therefore, the dimensions are set such that the outer diameter Dj of the trunnion journal 9 is increased. The outer diameter Ds of the spherical roller 4 is also increased along with the increase in the outer diameter Dj of the trunnion journal 9.

When the outer diameter Ds of the spherical roller 4 is increased, the outer diameter of the outer joint member 2 is also increased. Therefore, the width Ls of the spherical roller 4 is reduced so that the outer diameter of the outer joint member 2 is reduced.

When the width Ls of the spherical roller 4 is reduced, the outer diameter of the outer joint member 2 is also reduced. As a result, the value of "small inner diameter D2/large inner diameter D1" (D2/D1) is increased so that the unevenness between the small inner diameter D2 and the large inner diameter D1 is reduced. Through the reduction in the unevenness between the small inner diameter D2 and the large inner diameter D1, there is attained an advantage in the downweighting and forgeability.

From the viewpoint of the life (durability), the outer diameter Dj of the trunnion journal 9 is increased so that the number of needle rollers 5 to be mounted is increased to reduce a contact pressure. With this structure, the life equivalent to that of the related art is ensured.

Basic dimensional ratios of the tripod type constant velocity universal joint 1 according to this embodiment are shown in Table 1.

TABLE 1

| Item | Ratio (%) |
| --- | --- |
| (1) Shaft diameter/roller guide groove PCD (d/PCD) | 62 to 70 |
| (2) Trunnion barrel diameter/tripod member outer diameter (dr/SDj) | 63 to 70 |
| (3) Smaller inner diameter/larger inner diameter of outer joint member (D2/D1) | 73 to 80 |
| (4) Roller width/roller outer diameter (Ls/Ds) | 20 to 27 |
| (5) Trunnion journal diameter/roller outer diameter (Dj/Ds) | 54 to 57 |
| (6) Trunnion journal diameter/shaft diameter (Dj/d) | 87 to 93 |
| (7) Needle roller length/journal diameter (Ln/Dj) | 40 to 47 |

Next, a characteristic structure of the tripod type constant velocity universal joint according to this embodiment is described with reference to FIG. 4 to FIG. 10. As illustrated in FIG. 4, a corner portion 10b without having a recess shape is formed at the root portion A of the trunnion journal 9 of the tripod member 3 which is a component of the tripod type constant velocity universal joint 1. The corner portion 10b has a rounded shape. As a result of interference of an end surface corner rounded portion of the needle roller 5 with the corner portion 10b having the rounded shape, movement of the needle roller 5 toward the root portion A of the trunnion journal 9 is restricted. In this manner, a central position 5cp of a length Ln of the needle roller 5 can be caused to approximately match with a pitch circle diameter (PCD, see FIGS. 3 and 4) of the roller guide surfaces 7. Thus, a good load balance between the spherical roller 4 and the needle roller 5 is obtained to result in stable rotation of the needle roller 5.

Figure 5A:
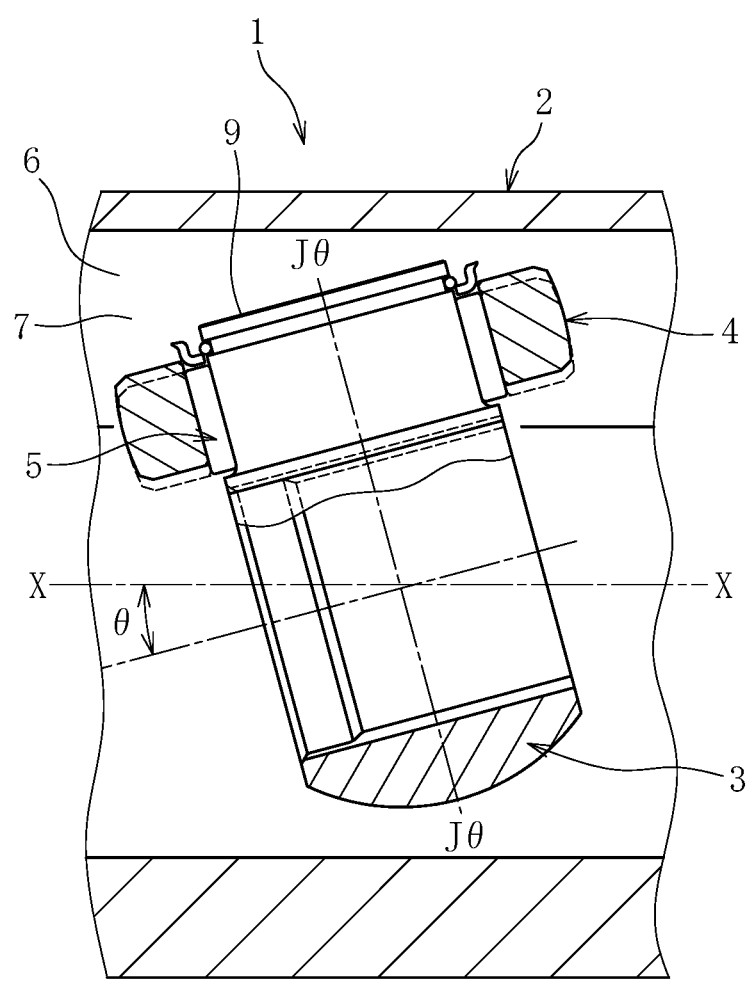
FIG. 5a is a longitudinal sectional view for illustrating a motion of the spherical roller when the tripod type constant velocity universal joint illustrated in FIGS. 1 takes the operating angle and for illustrating a state in which a tripod member is inclined with respect to an outer joint member.
Figure 5B:
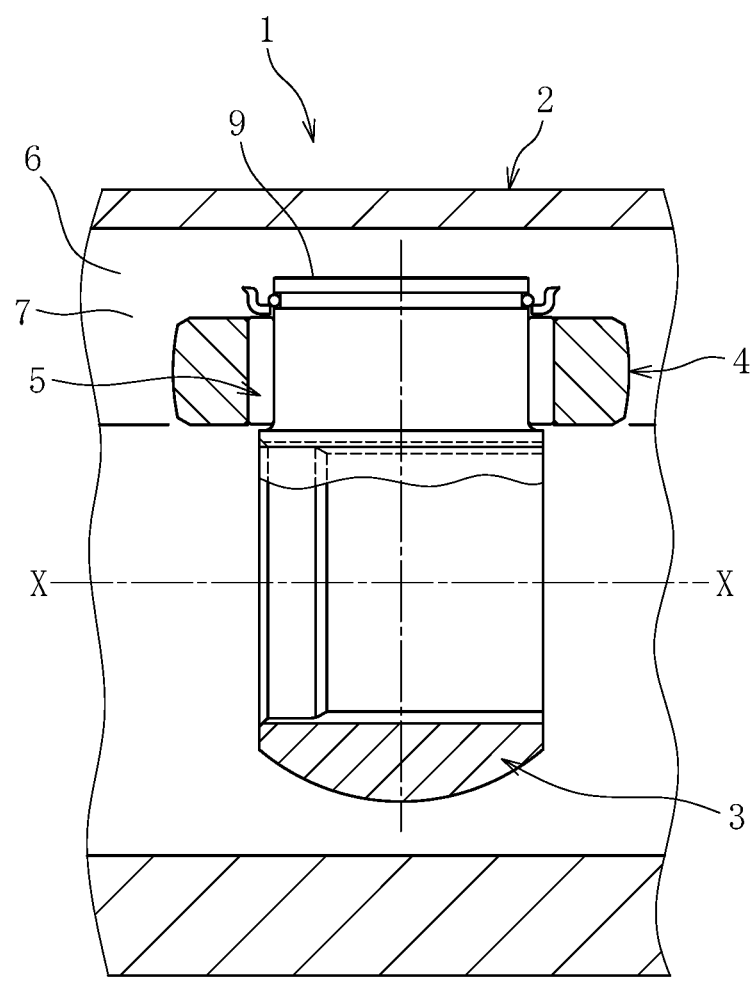
FIG. 5b is an illustration of a state in which the operating angle is 0° and for illustrating a state in which the tripod member is not inclined with respect to the outer joint member.

The above-mentioned rocking motion is described with reference to FIG. 5a and FIG. 5b. FIG. 5b is an illustration of a state in which the operating angle is 0°. FIG. 5a is an illustration of a state in which the operating angle θ is taken so that the trunnion journal 9 (spherical roller 4) rocks to the left side of FIG. 5b. The state of FIG. 5a is described in detail. One of the trunnion journals 9 (spherical rollers 4), which is positioned at a top dead center, specifically, a position at the phase angle of 0°, is inclined at the same angle as the operating angle θ so as to be positioned within the roller guide surface 7. The remaining two trunnion journals 9 (not shown; spherical rollers 4) provided at intervals of 120° in the circumferential direction from the position at the phase angle of 0° are positioned within the lower two roller guide surfaces 7 (see FIG. 1a). In this manner, axes of the three trunnion journals 9 and axes of the spherical rollers 4 are aligned on a plane Jθ which is inclined by an angle θ with respect to an axis X of the outer joint member 2. During one revolution of the joint, the rocking motion from the inclined state illustrated in FIG. 5a through a state inclined to the opposite side is made.

During the above-mentioned rocking motion, the spherical roller 4 is moved in the axial direction of the trunnion journal 9 relative thereto. A relative movement amount is described based on a state in which the operating angle is 0° as a reference. A position of the spherical roller 4 illustrated in FIG. 5b for illustrating the state in which the operating angle is 0° with respect to the trunnion journal 9 is indicated by the broken line in an overlapped manner on FIG. 5a for illustrating the state in which the tripod type constant velocity universal joint 1 takes the operating angle θ to rock to the left side. As described above, under the state in which the operating angle is taken, the spherical roller 4 is relatively moved in the axial direction of the trunnion journal 9.

A reason why the spherical roller 4 performs the above-mentioned operation is described with reference to FIGS. 6.

Figure 6A:
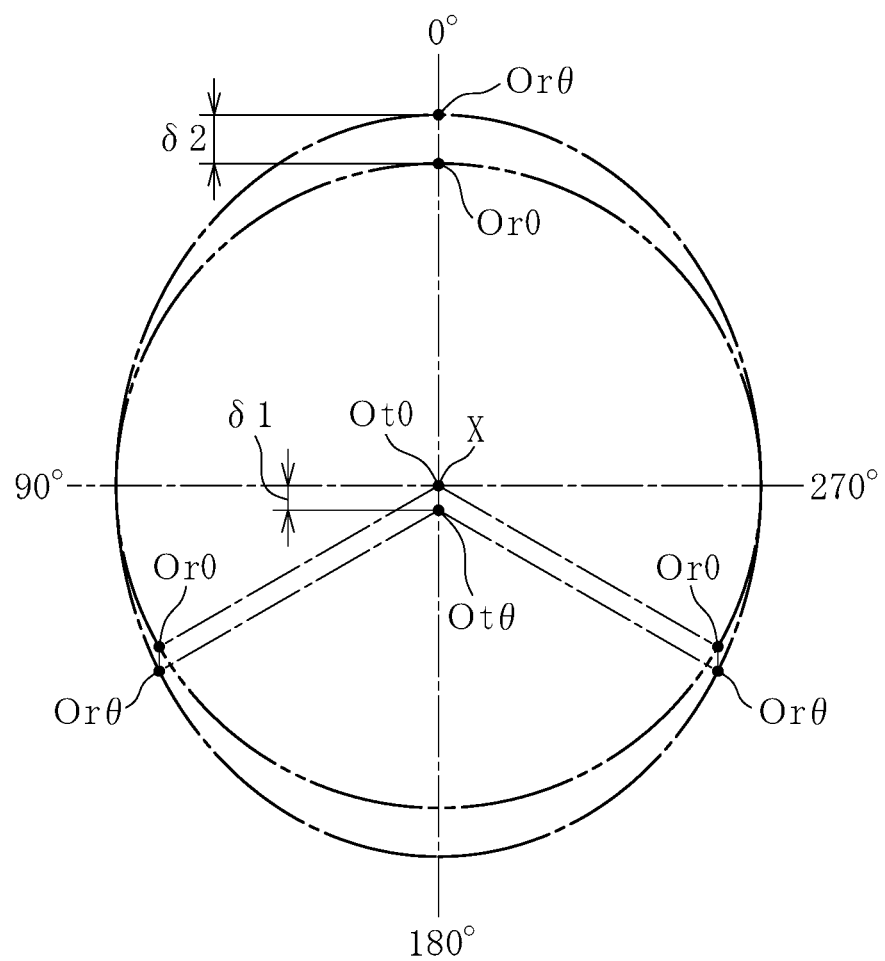
FIG. 6a is a schematic view for illustrating an operation of the spherical roller and for illustrating a state in which the spherical roller is positioned at a phase angle of 0°.
Figure 6B:
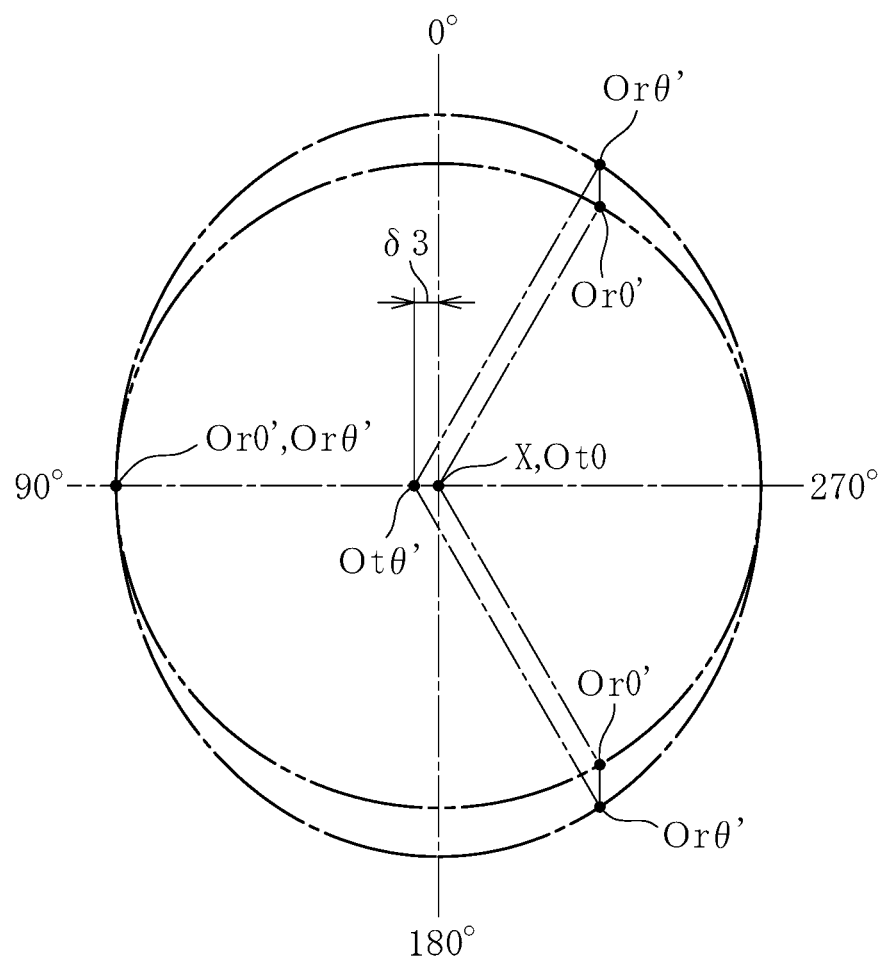
FIG. 6b is a schematic view for illustrating the operation of the spherical roller and for illustrating a state in which the spherical roller is positioned at a phase angle of 90°.

FIGS. 6 are schematic views for illustrating a center of the spherical roller 4. In FIG. 6a, there is illustrated the state of FIG. 5a, specifically, the state in which one of the trunnion journals 9 (spherical rollers 4) is positioned at the phase angle of 0°. In FIG. 6b, there is illustrated a state in which one of the trunnion journals 9 (spherical rollers 4) is positioned at the phase angle of 90°. In FIG. 6a and FIG. 6b, a pitch circle being a perfect circle indicated by the long dashed double-short dashed line is formed by connecting centers of the roller guide surfaces 7 in a state of taking the operating angle of 0°, specifically, in the state illustrated in FIG. 5b. An ellipsoidal pitch circle indicated by the long dashed short dashed line is formed by connecting the centers of the roller guide surfaces 7 on the plane Jθ inclined by the angle θ illustrated in FIG. 5a.

As illustrated in FIG. 6a, under the state in which the operating angle is 0°, the centers of the roller guide surfaces 7, which are also centers of the spherical rollers 4, are positioned at trisected positions Or0 on the pitch circle being the perfect circle indicated by the long dashed double-short dashed line in the circumferential direction. Under this state, a center Ot0 of the tripod member 3 matches with the axis X of the outer joint member 2. On a cross section along the plane Jθ inclined by the angle θ, centers Orθ of the roller guide surfaces 7 are positioned on the ellipsoidal pitch circle indicated by the long dashed short dashed line. The trunnion journals 9 radially project from trisected positions at intervals of 120° on the trunnion barrel 8 (see FIG. 1a) in the circumferential direction. Therefore, under the state in which the one trunnion journal 9 (spherical roller 4) is positioned at the phase angle of 0°, the center Otθ of the tripod member 3 is shifted to the lower side of FIG. 6a from the axis X of the outer joint member 2 by an amount δ1. Further, the centers Orθ of the roller guide surfaces 7 and the centers Or0 thereof are shifted by an amount δ2. Therefore, the spherical roller 4 positioned at the phase angle of 0° is moved toward an axial end of the trunnion journal 9 by an amount δ1+δ2 relative to the trunnion journal 9.

There is described a state in which one of the trunnion journals 9 (spherical rollers) 4 is positioned at the phase angle of 90° as a result of rotation of the tripod member 3 as illustrated in FIG. 6b. Under the state in which the operating angle is 0°, the centers of the roller guide surfaces 7, which are also the centers of the spherical rollers 4, are positioned at Or0' on the pitch circle being the perfect circle indicated by the long dashed double-short dashed line. In this state, the center Ot0 of the tripod member 3 matches with the axis X of the outer joint member 2. On the cross section along the plane Jθ inclined by the angle θ, centers Orθ' of the roller guide surfaces 7 are positioned on the ellipsoidal pitch circle indicated by the long dashed short dashed line. In this case, a center Otθ' of the tripod member 3 is shifted from the axis X of the outer joint member 2 to the left side of FIG. 6b by δ3. Along therewith, the spherical roller 4 positioned at the phase angle of 90° is moved toward the root portion A of the trunnion journal 9 by the amount δ3 relative to the trunnion journal 9.

When the one trunnion journal 9 (spherical roller 4) is positioned at the phase angle of 180° as a result of further rotation of the tripod member 3, a state similar to the above-mentioned state in which the phase angle is 0° is obtained. Further, when the one trunnion journal 9 is positioned at the phase angle of 270°, a state similar to the above-mentioned state in which the phase angle is 90° is obtained. The spherical rollers 4 repeat those operations. The constant velocity property of the tripod type constant velocity universal joint 1 is obtained by the above-mentioned shift motion between the center Otθ of the tripod member 3 and the center Otθ' thereof.

Figure 7:
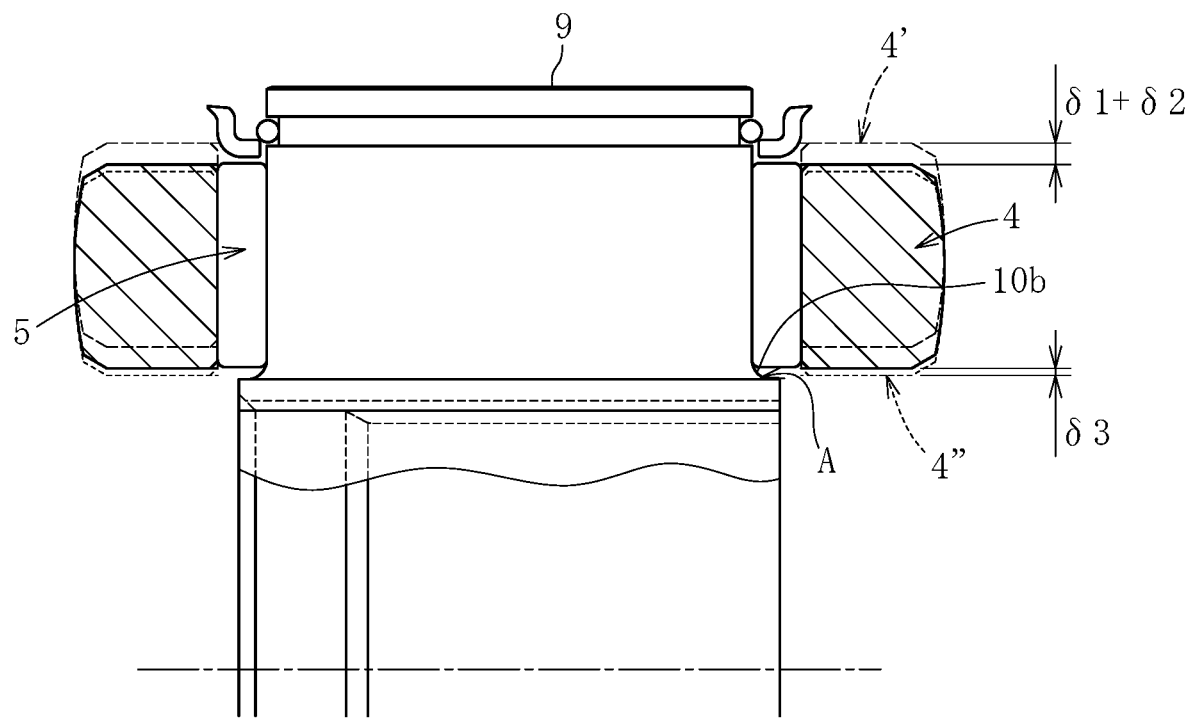
FIG. 7 is a longitudinal sectional view for illustrating a movement amount of the spherical roller.

The states of movement of the spherical roller 4 relative to the trunnion journal 9 are summarized in FIG. 7. The spherical roller 4 positioned at the operating angle of 0° is indicated by the solid line. A spherical roller 4' in a state of being relatively moved to be positioned at the phase angles of 0° and 180° is indicated by the broken line. A spherical roller 4" in a state of being relatively moved to be positioned at the phase angles of 90° and 270° is indicated by the thin broken line. Based on the position of the spherical roller 4 at the operating angle 0° as a reference, the spherical roller 4' is relatively moved toward the axial end of the trunnion journal 9 by the amount δ1+δ2, whereas the spherical roller 4" is relatively moved toward the root portion A of the trunnion journal 9 by the amount δ3.

The spherical roller 4 is relatively moved while making the above-mentioned rocking motion under a torque applied state. At this time, the needle roller 5 is rotated under a load applied by the spherical roller 4 to follow the movement of the spherical roller 4 in a direction of movement of the spherical roller 4. Therefore, when the spherical roller 4 (4") is relatively moved in a direction indicated by the thin broken line in FIG. 7, the needle roller 5 is moved toward the root portion A of the trunnion journal 9 to result in interference of the end surface corner rounded portion of the needle roller 5 with the corner portion 10b.

Details of a positioning structure of the needle roller 5 on a side of the root portion A of the trunnion journal 9 of the tripod type constant velocity universal joint 1 according to this embodiment are described with reference to FIGS. 8 to FIG. 10.

Figure 8A:
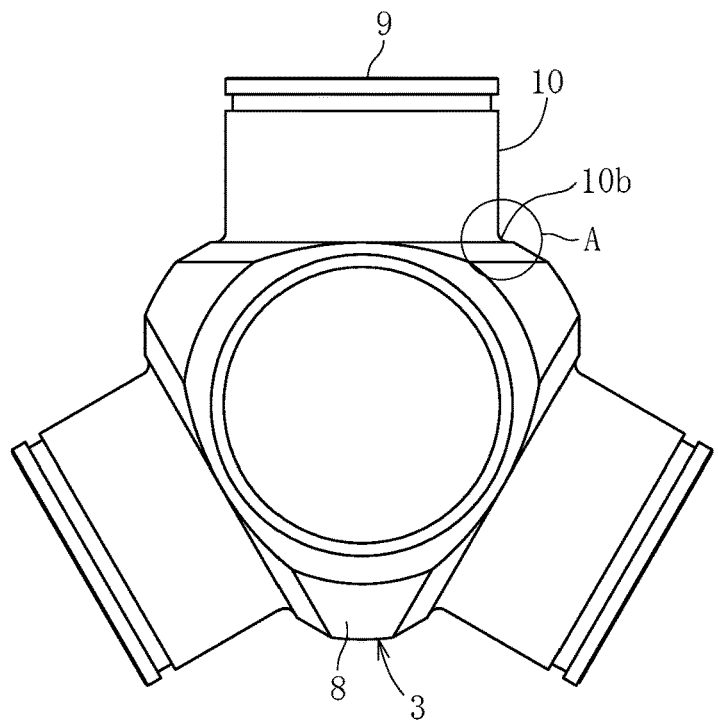
FIG. 8a is a side view for illustrating the tripod member illustrated in FIGS. 1 as viewed from a direction indicated by the arrows of the line F-F of FIG. 8b.
Figure 8B:
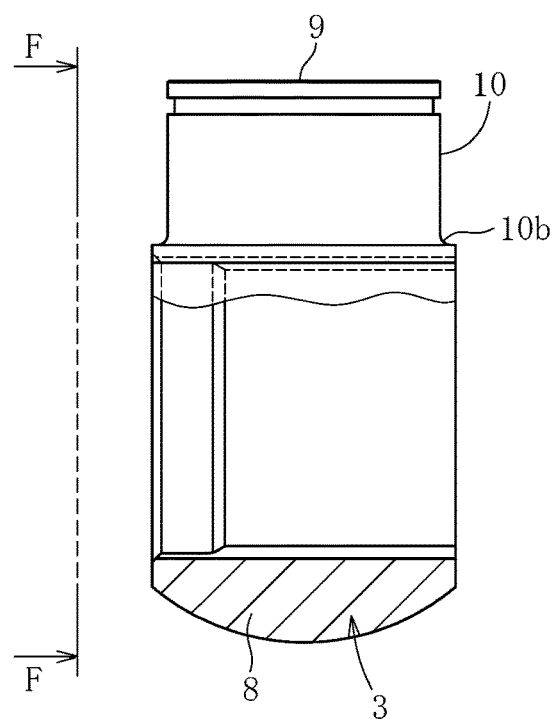
FIG. 8b is a longitudinal partial sectional view of the tripod member illustrated in FIGS. 1.

The tripod member 3 is illustrated in FIGS. 8. FIG. 8a is a side view as viewed from a direction indicated by the arrows of the line F-F of FIG. 8b, and FIG. 8b is a longitudinal partial sectional view thereof. The corner portion 10b is formed at the root portion A of the trunnion journal 9 of the tripod member 3. As illustrated in FIG. 8a and FIG. 8b, the corner portion 10b is formed over the entire periphery of the cylindrical outer peripheral surface 10 of the trunnion journal 9. In the trunnion journal 9, it is the cylindrical outer peripheral surface 10 that receives the applied torque.

Figure 9:
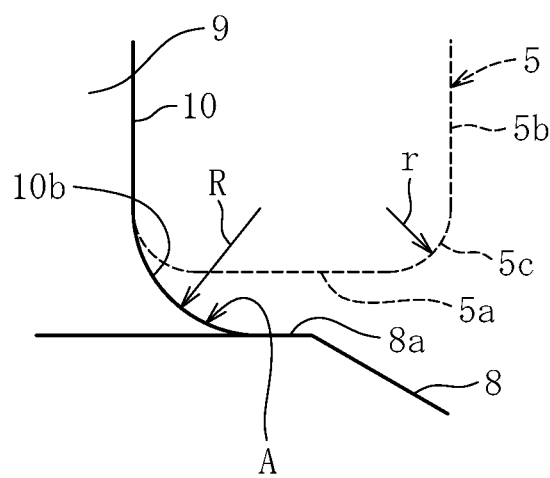

A specific shape of the root portion A of the trunnion journal 9 is illustrated in FIG. 9. In FIG. 9, a shape of the trunnion journal 9 is indicated by the solid line, and a shape of the needle roller 5 is indicated by the broken line. The corner portion 10b having the rounded shape with a curvature radius R is formed so as to be continuous with an end portion of the cylindrical outer peripheral surface 10 of the trunnion journal 9, which is closer to the root portion A. The corner portion 10b having the rounded shape is connected to the shoulder surface 8a of the trunnion barrel 8. The needle roller 5 has a flat end surface 5a. An end surface corner rounded portion 5c having a curvature radius r is formed between the end surface 5a and a rolling surface 5b. The end surface corner rounded portion 5c of the needle roller 5 interferes with a rounded rising portion of the corner portion 10b of the trunnion journal 9, thereby restricting the movement of the needle roller 5 toward the root portion A of the trunnion journal 9.

Findings and ideas obtained in a development process to achieve this embodiment are now described.

(1) It is essential to connect the cylindrical outer peripheral surface and the shoulder surface at the root portion of the trunnion journal of the tripod type constant velocity universal joint through the rounded shape in terms of strength. Therefore, when the rounded shape is connected to the shoulder surface through a shape without the recess, the inner washer is provided so as to achieve a structure in which the side surface of the washer and the end surface of the needle roller are held in contact with each other. When the inner washer is not provided, the recess having the rounded shape is provided for the connection to the shoulder surface. In this case, the end surface of the needle roller and the shoulder surface are held in direct contact with each other. As described above, it is general common technical knowledge to achieve the restriction with the end surface of the needle roller and a flange surface or the side surface of the inner washer, specifically, through the contact between the surfaces (see SAE Universal Joint and Driveshaft DESIGN MANUAL Section 3.2.6., FIG. 10 on page 138).

(2) For the development of the tripod type constant velocity universal joint having the small joint outer diameter based on the above-mentioned dimensional settings, attention was focused on impossibility of ensuring the length of the needle roller with the inner washer type structure. Thus, a tripod type constant velocity universal joint of type in which the recess was provided so that the end surface of the needle roller and the shoulder surface were held in direct contact with each other was manufactured so as to carry out a durability test. As a result, it was proven that damage due to an edge load was generated at the end portion of the needle roller on the side closer to the root portion and the rotation of the needle roller was not stable. Causes thereof were examined.

Figure 11:
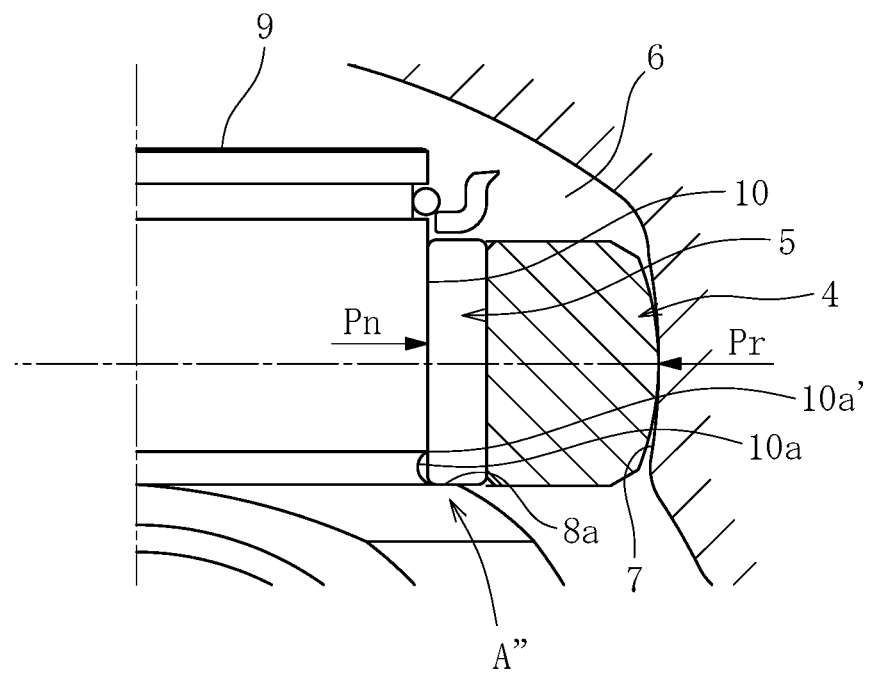
FIG. 11 is a transverse sectional view for illustrating findings in a development process.
Figure 12A:
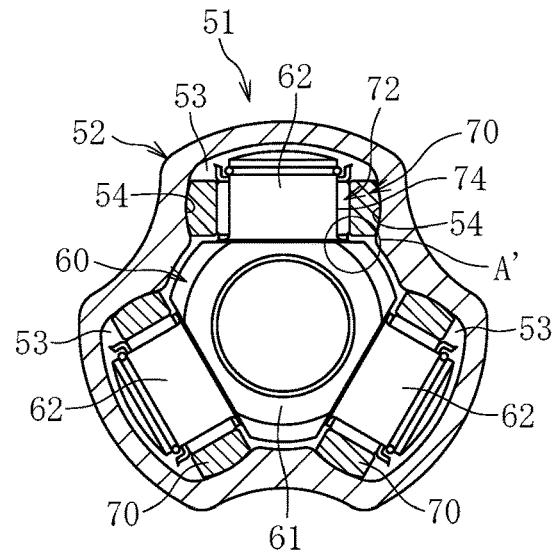
FIG. 12a is a transverse sectional view of a related-art tripod type constant velocity universal joint.
Figure 12B:
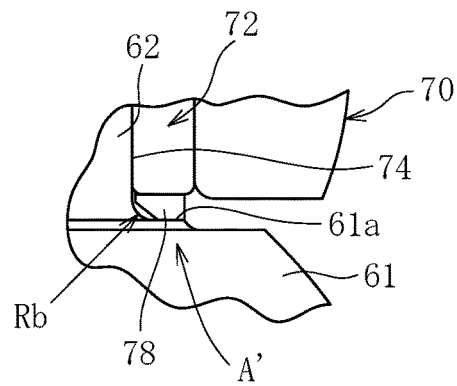
Figure 12C:
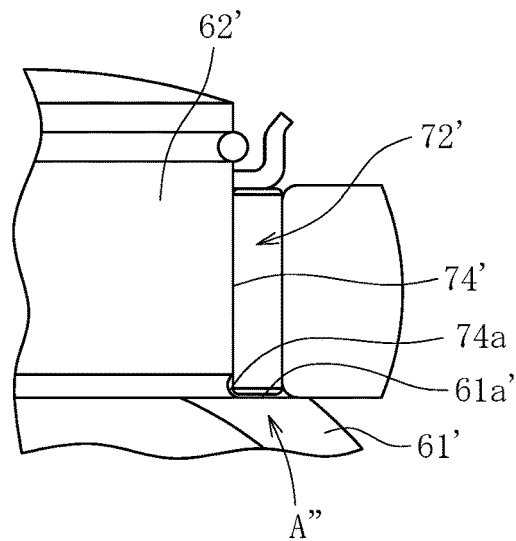
FIG. 12c is a view for illustrating a part of another related-art tripod type constant velocity universal joint.

As a result, the following was considered. Specifically, as illustrated in FIG. 11, when the needle roller 5 is moved toward the root portion A" to abut against the shoulder surface 8a, the end portion of the needle roller 5 is positioned at a boundary edge portion 10a' between the cylindrical outer peripheral surface 10 of the trunnion journal 9 and the recess 10a, and hence the edge load is generated. In addition, a contact length between the needle roller 5 and the cylindrical outer peripheral surface 10 of the trunnion journal 9 is reduced by a length of the recess 10a. Thus, a load center (center on the contact length) Pn of the needle roller 5 and a load center (center of the spherical roller in a width direction) Pr of the spherical roller 4 do not match with each other anymore in an axial direction of the trunnion journal 9. As a result, the load balance is lost to prevent the rotation of the needle roller 5 from being stable. This tendency becomes conspicuous in the compact tripod type constant velocity universal joint 1 with the reduced length Ln of the needle roller described above.

(3) Through the consideration in the item described above, there was obtained an idea that the contact of the needle roller 5 with the cylindrical outer peripheral surface 10 of the trunnion journal 9 over an entire length, which is except for the end surface corner rounded portion, and approximate match between the load center Pn of the needle roller 5 and the load center Pr of the spherical roller 4 with each other in an axial direction of the trunnion journal 9 were key components. This idea became a motivator to manufacture a test sample in which the corner portion without having the recess shape was formed at the root portion of the trunnion journal as a positioning structure for the needle roller which is beyond the common general technical knowledge, so as to attempt the durability test.

(4) As a result of the durability test described in the above-mentioned item, it was unexpectedly proven that the movement of the needle roller 5 toward the root portion A was successfully restricted by the interference between the end surface corner rounded portion 5c of the needle roller 5 and the corner portion 10b without the recess shape at the root portion A of the trunnion journal 9. The durability test was carried out to verify a life mode and a failure mode through rotation under a high load and was carried out under conditions of: applied load T=540 Nm, angle θ=6 degrees, and the number of revolutions N=270 rpm.

Figure 10:
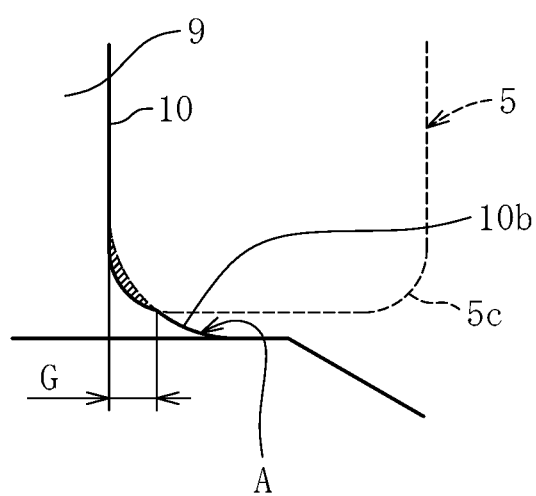
FIG. 10 is an enlarged view of the root portion A of FIG. 8a after a durability test.

A state of the corner portion 10b of the trunnion journal 9 after the durability test is illustrated in FIG. 10. As described above, the spherical roller 4 (see FIG. 7) is relatively moved while making the rocking motion under the torque applied state. As a result, the needle roller 5 is moved toward the root portion A of the trunnion journal 9 to result in interference of the end surface corner rounded portion 5c of the needle roller 5 with the corner portion 10b. During the durability test, the needle roller 5 applies a force to the corner portion 10b of the trunnion journal 9 with the end surface corner rounded portion 5c. The corner portion 10b is gradually plastically deformed so that a shape of the end surface corner rounded portion 5c of the needle roller 5 is transferred thereto. As illustrated in FIG. 10, however, it was verified that the plastic deformation converged within an allowable range G so as not to result in damage.

The reason for the result described above was considered as follows. When the tripod type constant velocity universal joint 1 is rotated while taking the operating angle θ, the trunnion journal 9 makes the rocking motion corresponding to a repeated wiper-like motion from a state inclined to one side to a state inclined to an opposite side for one revolution. A rolling amount of the needle roller 5 along with the rocking motion is significantly smaller than a rolling amount of a rolling element in a general rolling bearing, which is considered to be the reason for the result described above. Based on the findings and ideas described above, this embodiment was achieved.

It is preferred that the corner portion 10b at the root portion A of the trunnion journal 9 have the rounded shape. As a result, the strength of the root portion A is ensured to facilitate continuous hardened steel cutting work from the cylindrical outer peripheral surface 10 of the trunnion journal 9 to the corner portion 10b. Further, grinding with an integrated grinding stone from the cylindrical outer peripheral surface 10 of the trunnion journal 9 to the corner portion 10b is facilitated.

It is preferred that a ratio R/r of the curvature radius R of the corner portion 10b at the root portion A of the trunnion journal 9 and the curvature radius r of the end surface corner rounded portion 5c of the needle roller 5 be set in a range of from 1.0 to 5.0 in view of the strength, durability, and ease of processing of the root portion A.

The tripod member 3 is made of chromium steel (for example, SCr415 or SCr420) or chromium-molybdenum steel (for example, SCM420). It is preferred that a surface hardness of the cylindrical outer peripheral surface 10 of the trunnion journal 9 and the corner portion 10b at the root portion A be set smaller than a surface hardness of the needle roller 5. Specifically, a surface hardness of the trunnion journal 9 is set in a range of from HRC 57 to HRC 62, whereas a surface hardness of the needle roller 5 is set in a range of from HRC 60 to HRC 65. In this manner, the strength of the corner portion 10b at the root portion A can be ensured, while reliable positioning performance of the needle roller 5 is obtained.

The present invention is not limited to the above-mentioned embodiment. As a matter of course, the present invention may be carried out in various other embodiments without departing from the gist of the present invention. The scope of the present invention is defined in claims, and encompasses the meanings of equivalents described in claims and all changes within the scope of claims.

DESCRIPTION OF REFERENCE SIGNS 1 tripod type constant velocity universal joint
2 outer joint member
3 tripod member
4 spherical roller
5 needle roller
5c end surface corner rounded portion
6 track groove
7 roller guide surface
8 trunnion barrel
9 trunnion journal
10 cylindrical outer peripheral surface
10b corner portion
A root portion
Ls width of spherical roller
PCD pitch circle diameter of roller guide surface
R curvature radius
r curvature radius

The invention claimed is:

1. A tripod type constant velocity universal joint comprising:
an outer joint member having track grooves formed at trisected positions on the outer joint member in a circumferential direction of the tripod type constant velocity universal joint, the track grooves extending in an axial direction of the tripod type constant velocity universal joint;
a tripod member comprising trunnion journals radially projecting from trisected positions on a trunnion barrel in the circumferential direction; and
spherical rollers each fitted in a rotatable manner about one of the trunnion journals through intermediation of a plurality of needle rollers, movement of the needle rollers in an axial direction of an associated one of the trunnion journals being restricted,
wherein the spherical rollers are each movable in an axial direction of an associated one of the trunnion journals by relative movement with respect to the needle rollers of the associated one of the trunnion journals,
wherein the spherical rollers are received in the track grooves, each of the spherical rollers having an outer spherical surface guided by roller guide surfaces formed on both side walls of one of the track grooves,
wherein a corner portion without having a recess shape is formed at a root portion of each of the trunnion journals and is connected to a shoulder surface of the trunnion barrel, so as to restrict movement of each of the plurality of needle rollers associated with each of the trunnion journals in the axial direction toward the root portion of an associated one of the trunnion journals by interference between an end surface corner rounded portion of each of the plurality of needle rollers and the corner portion at the root portion of the associated one of the trunnion journals, without contact between the end surface of each of the plurality of needle rollers and the shoulder surface of the trunnion barrel.

2. The tripod type constant velocity universal joint according to claim 1, wherein the corner portion at the root portion of each of the trunnion journals comprises a rounded shape.

3. The tripod type constant velocity universal joint according to claim 1, wherein a ratio R/r of a curvature radius R of the corner portion at the root portion of each of the trunnion journals and a curvature radius r of the end surface corner rounded portion of each of the plurality of needle rollers is set in a range of from 1.0 to 5.0.

4. The tripod type constant velocity universal joint according to claim 1, wherein hardened steel cutting work is performed continuously from a cylindrical outer peripheral surface serving as a raceway surface of each of the trunnion journals to the corner portion at the root portion.

5. The tripod type constant velocity universal joint according to claim 1, wherein grinding with an integrated grinding stone is performed from a cylindrical outer peripheral surface serving as a raceway surface of each of the trunnion journals to the corner portion at the root portion.

6. The tripod type constant velocity universal joint according to claim 1, wherein a surface hardness of a cylindrical outer peripheral surface serving as a raceway surface of each of the trunnion journals and the corner portion at the root portion is set smaller than a surface hardness of each of the plurality of needle rollers.

7. The tripod type constant velocity universal joint according to claim 1, wherein a central position of each of the plurality of needle rollers over a length thereof approximately matches a pitch circle diameter (PCD) of the roller guide surfaces.

* * * * *